US006748379B2

(12) United States Patent
Martin, Jr.

(10) Patent No.: US 6,748,379 B2
(45) Date of Patent: Jun. 8, 2004

(54) GRAPHICAL REPRESENTATION OF DISORGANIZED DATABASE RECORDS IN AN IMS DATABASE

(75) Inventor: James L. Martin, Jr., Round Rock, TX (US)

(73) Assignee: BMC Software, Inc., Houston, TX (US)

(*) Notice: Subject to any disclaimer, the term of this patent is extended or adjusted under 35 U.S.C. 154(b) by 356 days.

(21) Appl. No.: 09/767,664

(22) Filed: Jan. 22, 2001

(65) Prior Publication Data

US 2002/0099704 A1 Jul. 25, 2002

(51) Int. Cl.[7] .................................................. G06F 7/00
(52) U.S. Cl. .................... 707/7; 707/2; 707/3; 707/4; 707/10; 707/100; 707/101; 707/201
(58) Field of Search .................. 707/10, 100, 101, 707/3, 4, 7, 201, 2

(56) References Cited

U.S. PATENT DOCUMENTS

| | | | | |
|---|---|---|---|---|
| 5,737,591 A | * | 4/1998 | Kaplan et al. ................. | 707/1 |
| 5,758,144 A | * | 5/1998 | Eberhard et al. .............. | 707/2 |
| 6,189,005 B1 | * | 2/2001 | Chakrabarti et al. ........... | 707/6 |
| 6,212,512 B1 | * | 4/2001 | Barney et al. ................. | 707/1 |
| 6,253,188 B1 | * | 6/2001 | Witek et al. | |
| 6,362,837 B1 | * | 3/2002 | Ginn ........................... | 345/751 |
| 6,427,151 B1 | * | 7/2002 | Chan et al. .................. | 707/101 |
| 6,438,563 B1 | * | 8/2002 | Kawagoe ..................... | 707/201 |
| 6,496,816 B1 | * | 12/2002 | Thiesson et al. | |
| 6,529,900 B1 | * | 3/2003 | Patterson et al. .............. | 707/3 |

OTHER PUBLICATIONS

IBM Database Analysis Tools from IBM, © IBM Corporation, 2000, 2 pages.
Pointer Checker Plus Data Sheet; © BMC Software, Inc., Feb. 1997 2 pages.

* cited by examiner

*Primary Examiner*—Shahid Alam
*Assistant Examiner*—Hung Pham
(74) *Attorney, Agent, or Firm*—Wong, Cabello, Lutsch, Rutherford & Brucculeri

(57) ABSTRACT

A method and system for displaying database record organization characteristics of IMS databases. In one embodiment, the method involves receiving information associated with a plurality of database records from an IMS database (e.g., information associated with ranges of database records). The database information may comprise information concerning database record organization characteristics. A working storage array may be built to consolidate the information associated with the plurality of database records. A plurality of view envelopes may be constructed. The plurality of view envelopes, along with a legend, may be graphically displayed on a display. User input may be received to request "inspection", "identification", "inspection/identification", or "detailed inspection" of a selected view envelope. Various methods may be used to "mark", "unmark", and "submit" at least one DBR to the mainframe computer system for reorganization. Display of database record organization characteristics after reorganization may also be requested by the user.

18 Claims, 8 Drawing Sheets

FIG. 7

GRAPHICAL REPRESENTATION OF DISORGANIZED DATABASE RECORDS IN AN IMS DATABASE

BACKGROUND OF THE INVENTION

1. Field of the Invention

The present invention relates to computer software, and more particularly to displaying database record organization data of IMS databases.

2. Description of the Related Art

The IMS database (IMS DB) was created in 1970 by International Business Machines Corporation (IBM) and is one of the two major parts to IBM's IMS/ESA (Information Management System/Enterprise Systems Architecture). The second part is a data communications system (IMS Transaction Manager or IMS TM). Together, the transaction manager and the database manager create a complete online transaction processing environment providing continuous availability and data integrity. IMS/ESA runs under the MVS/ESA or OS/390 operating systems, which run on the S/390 platform.

At the heart of IMS DB are its databases and its data manipulation language, Data Language/I (DL/I). The IMS database is a hierarchical (non-relational) database. IMS databases are hierarchic collections of data, information organized in a pyramid fashion with data at each level of the hierarchy related to, and in some way dependent upon, data at the higher level of the hierarchy. DL/I calls allows a user to create and access these IMS databases.

An IMS database may include one or more data set groups. Each data set group may include one or more segments. A segment is the smallest piece of data DL/I can store. Each segment may be qualified by its hierarchical relationship to other segments in a database record. Each database record has one root segment and zero or more child segments. A "root segment" is at the top of the hierarchy, and there may be only one root segment in a database record. All other segments (other than the one root segment) in a database record are referred to as "dependent segments", and their existence depends on there being a root segment. A "parent segment" is any segment that is defined in the database descriptor (DBD) as capable of having a dependent segment beneath it in the hierarchy. A "child segment" is any segment that is a dependent of another segment above it in the hierarchy.

Segments may be of various segment types. Those segments which share similar qualities are of the same type. For example, if the root segment of a database record represents a course, and that root segment has three child segments labeled: instructor, student, and location, those child segments may be referred to as segment types.

The root segment is referred to as a first level of the IMS database, and direct children of the root segment are referred to as a second level of the IMS database. As used herein, a second level of the IMS database may alternatively be referred to as a first level child segment, as child segments may only appear starting with the second level of the IMS database. Similarly, children of the children of the root segment (i.e., grandchildren of the root segment) are referred to as a third level of the IMS database, or alternatively, second level child segments. The level of each subsequent generation of children may be determined by incremented the previous level by one (e.g., a fourth level of the IMS database is equivalent to a third level child segment).

An IMS database includes a maximum of ten data set groups into which segments of an IMS database may be written. Each segment type may only be assigned to one data set group. When IMS databases are created, definitions of which data set group each segment type is to be written to are specified. In some cases, an IMS database may also be divided into partitions, in addition to being distributed across data set groups. A database record is made up of a root segment and child segments. As an IMS database is used, segments and database records are added, modified and deleted. Over time, the child segments of a database record may become scattered across different blocks within a data set group, resulting in slower access times and longer latencies than would occur if the child segments were closer together or contiguous. Reorganizing the location of the various segments of an IMS database such that segments of database records are closer together results in faster access times and shorter latencies.

The need to periodically reorganize an IMS database stems from the dynamic nature of insertions and deletions of segments in an IMS database. In general, as new child segments are added to an IMS database hierarchy, the segments may be added to blocks depending on space availability. As a result, related segments (i.e., segments belonging to the same database record) may be stored in different blocks, possibly non-contiguous blocks. Due to this scattering of related segments across different blocks within a data set group, over time, the IMS database becomes fragmented. Fragmentation exists in both segment to segment access and distribution of free space within the blocks. As a result, access of a database record may require reading a number of non-contiguous blocks, which results in lengthier access times. One method of reducing access times is to reorganize the IMS database in order to more closely position segments belonging to the same database record and to re-distribute areas of free space for later insertions.

The current technique of timing reorganizations of IMS databases (i.e., deciding when to initiate a reorganization) is typically based on either a temporal trigger (e.g., daily, weekly, monthly, quarterly), a volume trigger (e.g., after 1,000 transactions), or a shortage of free space available to hold new database data. Failure to detect or anticipate a shortage of free space may cause the database and supporting applications to suffer an 'outage' and therefore be unable to perform important business tasks. Failure of the applications to perform the business tasks may result in significant lost revenue and business opportunities. It is desirable to have a method of analyzing database record organization characteristics that may be able to recognize that the amount and distribution of free space available in an IMS database (or even a selected block or data set group sub-set of an IMS database) is approaching a threshold. Reaching this threshold would indicate either a benefit from reorganizing the IMS database or the potential for a database 'outage' due to lack of free space.

A visual or graphical representation of the database record organization may allow an 'outage' to be avoided. A visual or graphical representation of the database record organization characteristics of an IMS database may also be helpful for a DBA (database administrator) or other knowledgeable user in adjusting database parameters that control how insertions, modifications, and deletions of database records within the database are managed. It is desirable for a DBA or other knowledgeable user to have access to the graphical representation of the database record organization characteristics of the IMS database remotely (i.e., without requiring the user to manually connect/login to the IMS database), for purposes of analysis. For at least the foregoing reasons, there is a need for an improved system and method for displaying the database record organization characteristics of databases, such as IMS databases.

SUMMARY OF THE INVENTION

The present invention provides various embodiments of an improved method and system for displaying database record organization characteristics of IMS databases. In one embodiment, the method involves receiving information associated with a plurality of database records from a database (e.g., an IMS database). The information associated with the plurality of database records may comprise information associated with ranges of database records within the database. The information associated with the plurality of database records may be transmitted to a client computer system, such as a Microsoft Windows based computer system, for display in a graphical user interface. The transmission may be accomplished through various conventional means (e.g., ftp (File Transfer Protocol) or TCP/IP (Transmission Control Protocol/Internet Protocol)). The transmission may be initiated from either the mainframe computer system or from the client computer system.

The information associated with the plurality of database records may be processed to generate database information. The database information may comprise information concerning database record organization characteristics (e.g., an amount (e.g., a percentage or a range of percentages) of reorganization required for the database records). Calculations of view ratios may be made, based upon the database information. A working storage array may be built to consolidate the information associated with the plurality of database records. A plurality of view envelopes may be constructed, based upon data in the working storage array. The size of the plurality of view envelopes constructed may be based upon a first view ratio.

The plurality of view envelopes may be graphically displayed on a display. A legend may also be displayed on the display, for purposes of explaining the various markings and/or colors within each view envelope. Database record (DBR) key values may be displayed, to indicate the DBRs corresponding to the view envelopes displayed.

User input may be received. The user input may specify a sub-set of the plurality of view envelopes to be graphically displayed. The user input may be to request "inspection" of a selected view envelope. Inspecting a view envelope is a way to see more detailed information about the database record organization characteristics represented by a single view envelope (e.g., in need of reorganization; recently reorganized; organized). The user input may be to request "identification" of a selected view envelope. Identifying a view envelope is a way to display identifying information about the view envelope (e.g., Low Key, High Key, Reorganization needed (i.e., the count of DBRs classified as needing reorganization), and database record (DBR) reorganized (i.e., the count of DBRs previously reorganized)).

An "inspection/identification" (i.e., an inspection followed by an identification) of a collapsed DBR key may be a way to display identifying information about the DBR (e.g., Key, Blocks Used, Estimated Blocks needed, Mark for reorganization, and Submit for reorganization). A "detailed inspection" of an inspected collapsed DBR key may be a way to display identifying information about the blocks used by a DBR key (e.g., view envelopes indicating "% of block used" for each block used by the DBR).

The concept of "marking", "unmarking", and "submitting" a DBR may be extended to all DBRs in the database, through any of various methods (e.g., a menu item with the choices: (1) submit all DBR (database records) for reorganization; (2) submit all marked DBR for reorganization; (3) unmark all DBRs; (4) mark all DBRs). Upon submission, the keys associated with the marked DBRs may be transmitted through various conventional means from the client computer system to the mainframe computer system. After completion of the DBR reorganizations requested, the mainframe computer system may transmit the updated database record organization characteristics to the client computer system. The client computer system may display "before" and "after" database record organization characteristics, as appropriate.

BRIEF DESCRIPTION OF THE DRAWINGS

A better understanding of the present invention can be obtained when the following detailed description of various embodiments is considered in conjunction with the following drawings, in which:

FIG. 7 is a screen shot of an expansion of an inspected database record with DBR key 001823 according to one embodiment.

Figure 1:
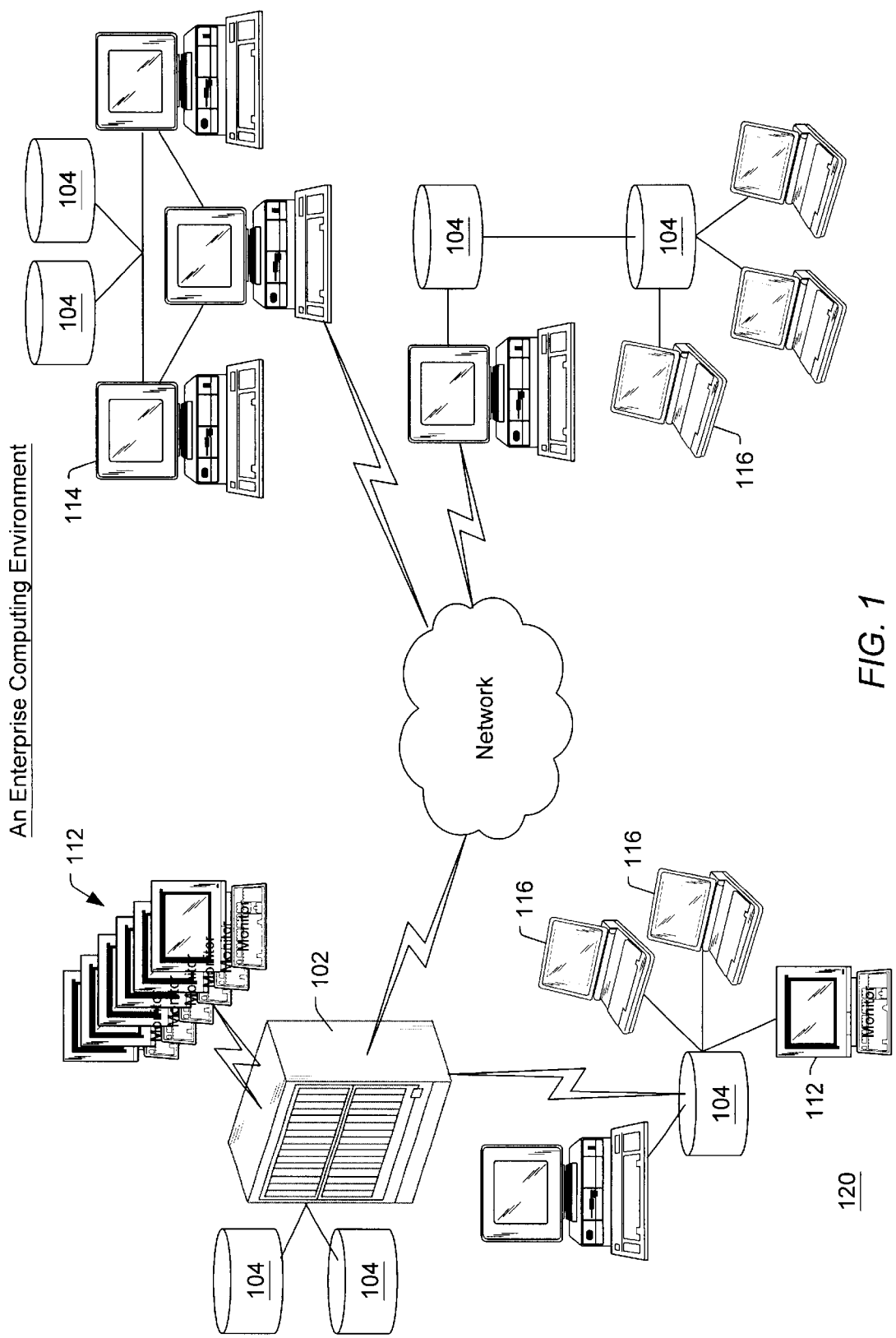
FIG. 1 illustrates an exemplary enterprise computing environment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

Incorporation by Reference

U.S. application Ser. No. 09/680,059 titled "Graphical Display of IMS Space Usage Characteristics" and filed Oct. 4, 2000, whose inventor is James L. Martin Jr., is hereby incorporated by reference as though fully and completely set forth herein.

FIG. 1: An Enterprise Computing Environment

FIG. 1 illustrates an exemplary enterprise computing environment according to one embodiment of the present invention. As shown, the enterprise computing environment may include one or more computers 102, shown as mainframe computers 102, which each include one or more storage devices 104, also referred to as direct access storage devices (DASD). A plurality of computer systems or terminals 112 may be coupled to the mainframe computer 102, wherein the computer systems or terminals 112 access data stored in the storage devices 104 coupled to or comprised in the mainframe computer 102.

The mainframe computer system 102 may be coupled to one or more other computer systems and/or computer networks. The mainframe computer system 102 may be coupled locally to a computer system network 120 in a local area network (LAN) configuration, or may be coupled to one or more computer systems and/or networks through a wide area network (WAN). As shown in FIG. 1, the mainframe computer system 102 may be directly coupled to a local area network 120, such as a PC-based or client/server based network. The LAN 120 may comprise a storage device or file server 104 coupled to one or more desktop computer systems 114, one or more portable computer systems 116 and possibly one or more computer systems or terminals 112. As also shown in FIG. 1, the mainframe computer 102 may also be coupled through a wide area network, represented by the "cloud" in FIG. 1, to one or more additional local area networks, such as PC-based networks as shown. Each of the PC based networks may comprise one or more storage devices or file servers 104 and one or more of either desktop computer systems 114 or portable computer systems 116. The wide area network may be any of various types, such as the Internet.

Each of the one or more mainframe computer systems 102, the computer systems 114 and 116, as well as file servers 104 may include various components as is standard in computer systems. For example, the mainframe computer system 102 may include one or more processors or CPUs, preferably multiple CPUs, as well as non-volatile memory, such as represented by elements 104, and various internal buses etc. as is well known in the art, as well as a display device. In a similar manner, each of the desktop computer systems 114 and/or portable computer systems 116, or other computer systems comprised in the enterprise, comprise various standard computer components including one or more CPUs, one or more buses, memory, a power supply, non-volatile memory, and a display, such as a video monitor or LCD display. The computer systems or terminals 112 may comprise standard "dumb" terminals as used with mainframes, i.e., may comprise a display and video hardware and/or memory for displaying data on the display provided from the mainframe computer system 102.

The mainframe computer system 102 may store a database comprising data which is desired to be accessible among a portion or all of the enterprise, e.g., is desired to be accessible by one or more of the computer systems 114 and 116. In the present application, the term "database" includes both databases and data sets, such as an IMS data set, among others. In one embodiment, the database stored in the mainframe computer system 102 is desired to be distributed among one or more of the various file servers 104 connected to the various computer systems 114 and 116. Thus, it is desired that the data comprising the database be distributed among the enterprise for ready access among multiple users. It is also possible that multiple different database management systems are used within the enterprise, i.e., one or more of the file systems 104 may store its own database which is desired to be replicated among various of the other file servers and/or the mainframe computer system 102. In the preferred embodiment, the database stored on the mainframe computer system is the IMS database. However, the present invention may be used with other types of databases.

One embodiment of the present invention preferably comprises software programs designed to graphically display database record organization characteristics, said software programs stored in the mainframe computer system 102 and/or one or more of the computer systems 114, 116 or 104 which operate to provide various services. Where the database used is the IMS database, the database record organization software programs comprise IMS database record organization software programs. The IMS database record organization software programs are preferably comprised on the one or more of the computer systems 114, 116. However, it is noted that portions of the IMS database record organization software programs may be distributed throughout one or more computers in the enterprise, including the mainframe computer system 102. Also, the IMS database record organization software programs preferably interface to one or more various OEM utilities.

One or more of the computer systems 102, 112, 114, and 116 preferably include a memory medium on which computer programs according to the invention may be stored. The term "memory medium" is intended to include an installation medium, e.g., a CD-ROM, or floppy disks, a computer system memory or random access memory such as DRAM, SRAM, EDO RAM, Rambus RAM, etc., or a non-volatile memory such as a magnetic media, e.g., a hard drive, "DASD", or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer systems 102/104, 112, 114, and 116 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium preferably stores a software utility program or programs for graphically displaying database record organization characteristics as described herein. The software program(s) may be implemented in any of various ways, including procedure-based techniques, component-based techniques, and/or object-oriented techniques, among others. For example, the software program may be implemented using ActiveX controls, C++ objects, Java objects, Microsoft Foundation Classes (MFC), or other technologies or methodologies, as desired. A computer system executing code and data from the memory medium comprises a means for graphically displaying database record organization according to the methods and/or block diagrams described below.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks 102 and/or 104 and/or a wireless link.

In the preferred embodiment, the present invention comprises one or more software components, preferably a plurality of software components, which operate to provide various graphical displays of database record organization of databases, such as IMS databases.

According to one embodiment of the present invention, a DBA (Data Base Administrator) or other knowledgeable user may adjust database parameters that control how insertions, modifications, and deletions of database records within the database are managed, in response to the graphical display of the database record organization characteristics. Further, the DBA or other knowledgeable user may analyze the graphical representation of the database record organization characteristics of the IMS database remotely (i.e., without requiring the user to manually connect/login to the IMS database).

Figure 2:
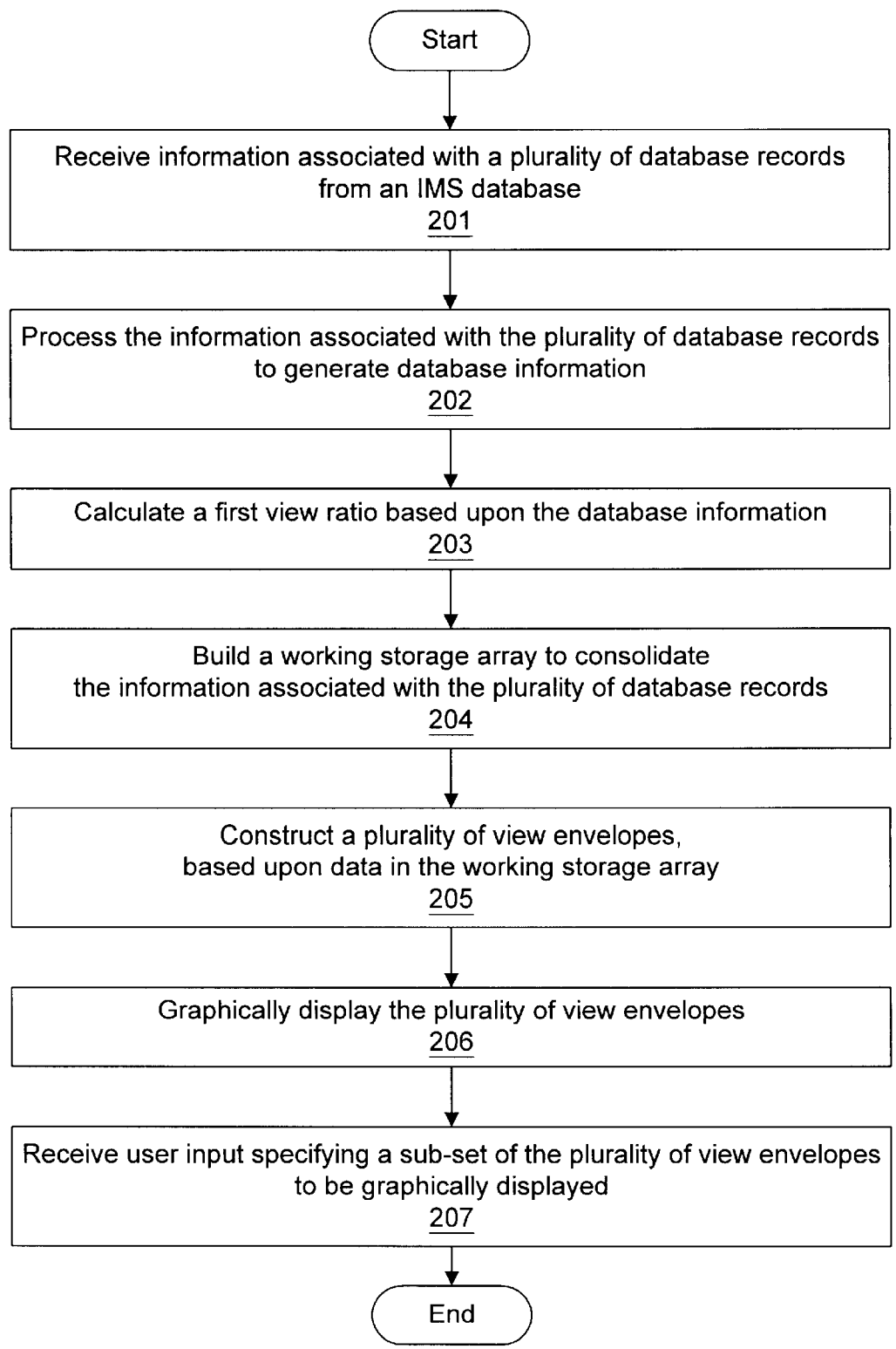
FIG. 2 is a flowchart illustrating an overview of graphically displaying database record organization characteristics of an IMS database according to one embodiment.

FIG. 2: Graphical Display of Database Record Organization in an IMS Database

FIG. 2 is a flowchart illustrating an embodiment of a system and method for graphically displaying database record organization characteristics of an IMS database.

In step 201, information associated with a plurality of database records from an IMS database may be received. The information associated with the plurality of database records may comprise information associated with ranges of database records within the IMS database. In one embodiment, an IMS database extraction utility may be used to create the information associated with the plurality of database records.

In step 202, the information associated with the plurality of database records may be processed to generate database information. The database information may comprise information concerning the percentage of reorganization required for ranges of database record key values, indications of whether particular database record key values are in need of reorganization, are already organized, or have been recently reorganized. In step 203, a first view ratio may be calculated based upon the database information generated in step 202.

In step 204, a working storage array may be built, wherein the working storage array consolidates the information associated with the plurality of database records. As used herein, a working storage array may be used as a place to hold the database information received from the IMS database such that as various presentations or slices of the data are requested by a user, multiple retrievals of similar information regarding the state of the IMS database are not necessary. Thus, the working storage array may be referenced for the particular sub-set of information requested, based on user input, rather than requiring access to the IMS database to retrieve the particular sub-set of information requested.

In step 205, a plurality of view envelopes may be constructed, based upon data in the working storage array. The size of the plurality of view envelopes constructed may be based upon the first view ratio.

In step 206, database record organization characteristics may be graphically displayed on a display. The database record organization characteristics may be determined from at least a sub-set of the plurality of view envelopes. A legend, as described below, may also be displayed on the display, for purposes of explaining the various markings and/or colors within each view envelope. Database record key values (DBRs) may be displayed, to indicate the DBRs corresponding to the view envelopes displayed.

In step 207, user input may be received. The user input may specify a sub-set of the plurality of view envelopes to be graphically displayed. In one embodiment, which may be referred to as "identification", one of the plurality of view envelopes may be selected, detailed information for the selected view envelope may be graphically displayed on the display, including more detailed information for the selected view envelope than is shown for the plurality of view envelopes. The detailed information for the selected view envelope may include one or more of the following items related to the database records represented by the selected view envelope: a low database record key value; a high database record key value; a count of database record key values represented that are in need of reorganization; and a count of database record key values represented that have been reorganized.

In an alternate embodiment, which may be referred to as "inspection", one of the plurality of view envelopes may be selected, a listing of database records beginning with the database record represented by the selected view envelope may be graphically displayed on the display, including an indicator signifying whether more detailed information is available for the database records displayed.

In one embodiment, which may be referred to as "identification of an inspected database record", one of the plurality of view envelopes may be selected, detailed information for the selected view envelope may be graphically displayed on the display, including more detailed information for the selected view envelope than is shown for the plurality of view envelopes. The detailed information for the selected view envelope may include one or more of the following items related to the database records represented by the selected view envelope: a database record key value; an indicator regarding whether reorganization is required; a count of blocks used for the database record; a count of estimated blocks needed for the database record; an indicator regarding whether the database record has been marked for reorganization; and an indicator regarding whether the database record has been submitted for reorganization.

FIGS. 3–8: Menu Item Descriptions

Each of FIGS. 3 through 8 may include the following menu items: File, Options, Window, Zoom, Key, and Help. Each menu item may include sub-menu items. For example, the Options menu item may include the following sub-menu items: (1) submit all DBR (database records) for reorg; (2) submit all marked DBR for reorg; (3) unmark all; (4) mark all; among others. One benefit of the Options menu is the ability to globally apply an action (e.g., submit, mark, unmark) to all of the DBR keys without a lot of keystrokes.

Figure 6:
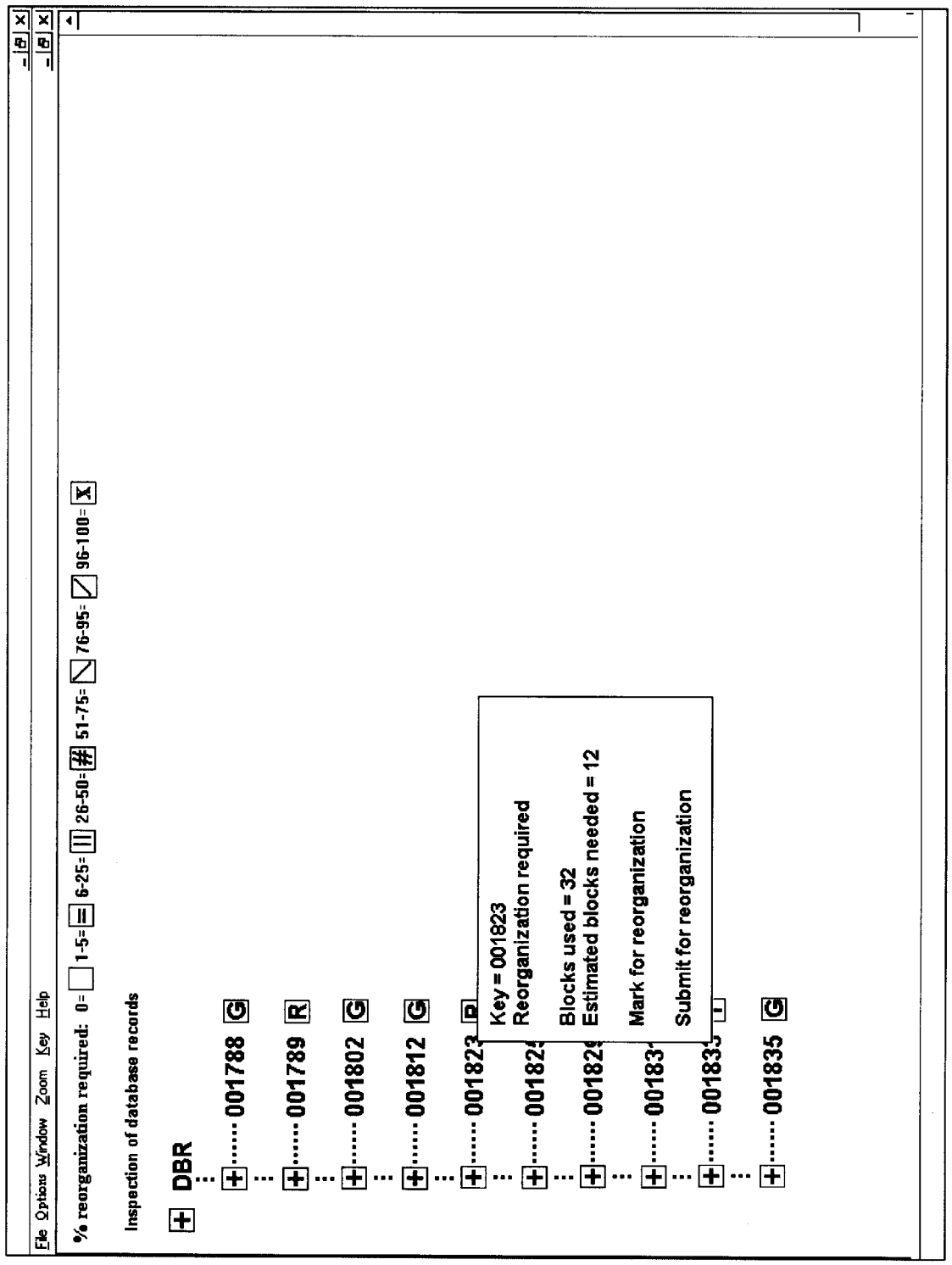
FIG. 6 is a screen shot of an identification of an inspected database record beginning with DBR key 001823 according to one embodiment.

A description of one method of "marking" a database record (DBR) is described under FIG. 6. In that method, the key of a "marked" DBR is placed on a reorganization list. Conversely, when a DBR is "unmarked", the key of the DBR is removed from the reorganization list. Another method of "marking" DBRs may be via selection of the "mark all" sub-menu item of the Options menu. In one embodiment, selection of the "mark all" sub-menu item of the Options menu may cause all DBRs to be placed on the reorganization list. The "submit all marked DBR for reorg" sub-menu item of the Options menu may cause all DBR keys in the reorganization list to be submitted to the mainframe computer system for reorganization. Similarly, the "submit all DBR for reorg" sub-menu item of the Options menu may cause all DBR keys to be submitted to the mainframe computer system for reorganization, without regard to their presence or absence on the reorganization list.

In one embodiment, the Window menu item may include a tile sub-menu item and a cascade sub-menu item, among others. Tiling of windows may allow for multiple windows to appear within one standard screen. Cascading of windows may allow for multiple windows to overlap each other such that each window's title remains visible, and may be selected.

Figure 3:
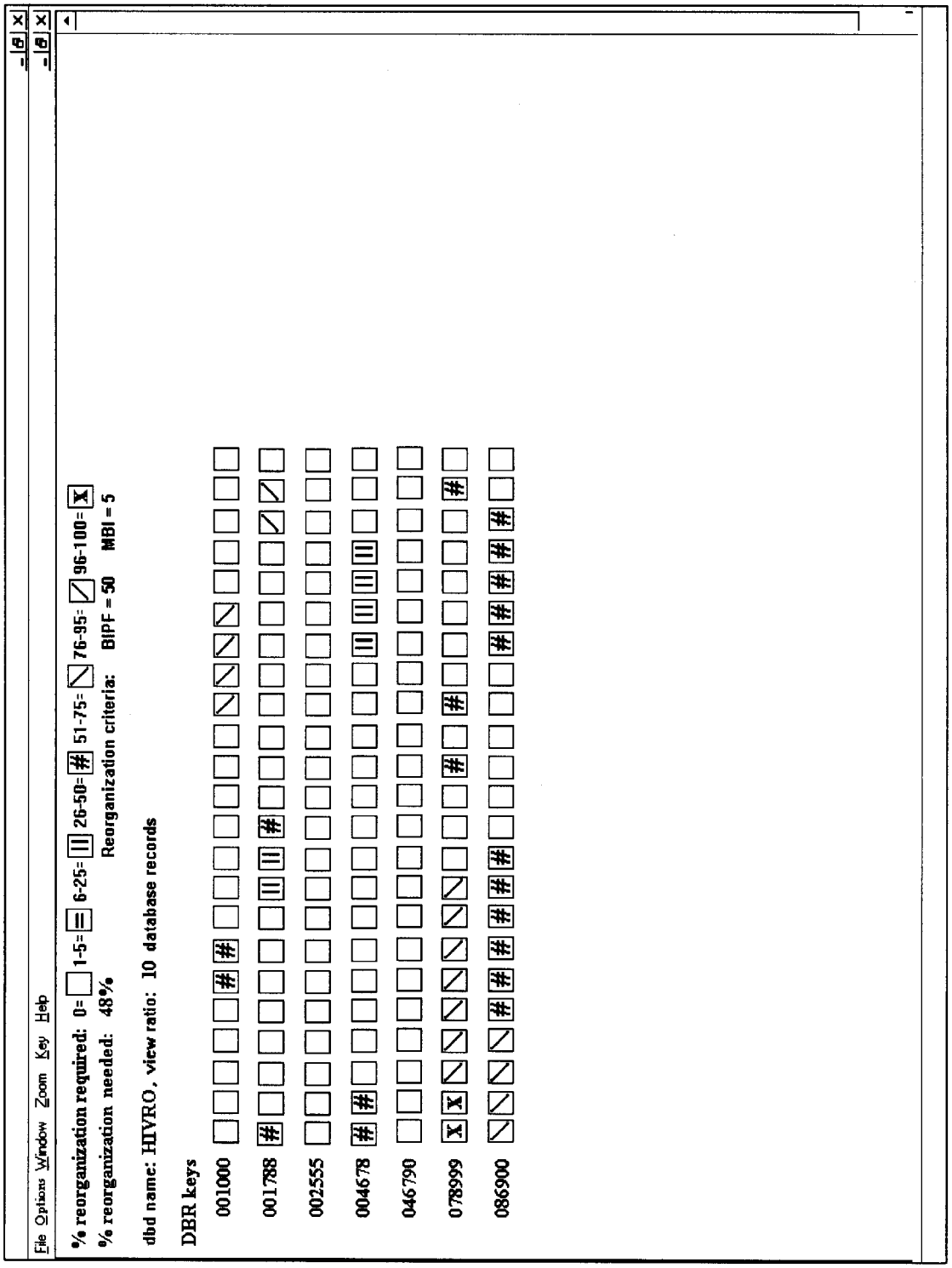
FIG. 3 is a screen shot of an initial view of IMS database HIVRO, with a view ratio of 10 database records, displaying database record organization characteristics of the IMS database according to one embodiment.

FIG. 3: Initial View of IMS Database HIVRO

FIG. 3 is a screen shot of an embodiment of an initial view of an IMS database HIVRO, with a view ratio of 10 database records, displaying the organization characteristics of the database records of the IMS database. The information or records that form the source of the database record organization characteristics displayed in the screen shot may be extracted from the HiVRO IMS database on a mainframe computer system. Subsequent to the extraction on the mainframe, the data may be transmitted to a client computer system, such as a Microsoft Windows based computer system, for display in a graphical user interface. The transmission may be accomplished through various conventional means (e.g., ftp (File Transfer Protocol) or TCP/IP (Transmission Control Protocol/Internet Protocol)). The transmission may be initiated from either the mainframe computer system or from the client computer system.

As shown in FIG. 3, the three lines at the top of the screen comprise a legend for a view envelope area or view envelope mapping. The legend may include an explanatory list of the meaning of the various markings and/or colors of the view envelopes in the view envelope area, along with a description of the contents of the view envelope area. As used herein, a "view envelope" comprises information displayed on the display (i.e., on the graphical user interface or GUI of the display) that graphically represents database record organization characteristics within a database, such as an IMS database. The view envelope may utilize different colors and/or markings to indicate different types of information, such as the percentage of database records requiring reorganization. As used herein, database record organization characteristics may include percentage of reorganization required on a view envelope basis. In one embodiment, various colors may be used to represent various ranges of percentage of database records requiring reorganization (e.g., 0% reorganization required=dark green, 1–5% reorganization required=dark blue, 6–25% reorganization required=light blue, 26–50% reorganization required=orange, 51–75% reorganization required=pink, 76–95% reorganization required=yellow, 96–100% reorganization required=black). In an alternate embodiment, grayscale or various shades of black-and-white may be used in place of color to distinguish between the various ranges of percentage of reorganization required. Yet another embodiment may include various symbols or markings (e.g., ===, |||, ###, \\\, ///, XXX, ~~~, <<<<<,>>>>, ****) that may easily be distinguished when printed in black-and-white.

The view envelope area preferably appears below the legend. The view envelope area may include one or more view envelopes. An individual view envelope may represent a number of database records within an IMS database. The DBR (database record) key of the first database record represented by the first view envelope in a view envelope area may appear to the left of that view envelope. The first view envelope may also represent additional database records, however, only the first database record represented by the first view envelope may appear to the left of that view envelope as a reference point to the beginning database record range represented by that view envelope. The second and subsequent view envelopes in a row in a view envelope area typically do not have their corresponding DBR keys explicitly noted in the view envelope area. When the number of view envelopes in a view envelope area exceeds the number of view envelopes that will fit on one row, the first view envelope on the second row of the view envelope area is typically preceded by the DBR key of its corresponding database record. Subsequent rows of view envelopes may follow the same pattern (i.e., the first view envelope of a row preceded by the DBR key of its corresponding database record, the subsequent view envelopes in a row following the first view envelope of the row, without their corresponding DBR keys explicitly identified).

The first line of the legend, as shown in FIG. 3, indicates that the symbol within the view envelope refers to the percentage of reorganization required in the view envelope. Although seven ranges of "% reorganization required" are shown (i.e., 0, 1–5, 6–25, 26–50, 51–75, 76–95, 96–100), in alternate embodiments the number of ranges of "% reorganization required" may be increased or decreased, as well as the actual breakpoints (i.e., at what percentage each range begins and ends) of the ranges may be different. In one embodiment, the user may specify the number of ranges and the breakpoints of the ranges.

The second line of the legend, as shown in FIG. 3, includes the following values: "% reorganization needed: 48%" and "Reorganization criteria: BIPF=50 MBI=5". The "% reorganization needed: 48%" may refer to the total database population (i.e., 48% of all database records require reorganization based upon the specific BIPF and MBI values shown). For example, if there are 100 database records in total, and 48 of those 100 database records require reorganization based upon a BIPF of 50 and an MBI of 5, then the % reorganization needed is 48%.

As used herein, a "block improvement percentage factor (BIPF)" is the minimum percentage in terms of a reduction in blocks used by the database record after reorganization. For example, consider a database record that uses 10 blocks prior to reorganization, and 5 blocks after reorganization; the database record yields a BIPF of 50% (i.e., BIPF=(pre-reorganization number of blocks–post-reorganization number of blocks)/(pre-reorganization number of blocks)=(10–5)/10=5/10=50%).

As used herein, a "minimum block improvement (MBI)" is used to qualify BIPF since several combinations of post-reorganization number of blocks and pre-reorganization number of blocks may yield the same BIPF (e.g., (10–5)/10 and (2–1)/2 both yield a 50% BIPF value). Specifying an MBI of 5 may indicate that the database record (DBR) reorganization must save at least 5 blocks. In one embodiment, these two factors (BIPF and MBI) may be combined, thus requiring a minimum value for each factor before a DBR reorganization is implemented. Using the numbers from the previous examples, reorganization may be implemented when BIPF>=50% and MBI >=5 (i.e., as long as the improvement in blocks is greater than or equal to 50% and the number of blocks saved is greater than or equal to 5, then the DBR reorganization should take place).

The third line of the legend, as shown in FIG. 3, describes the contents of the view envelope area, including the following: database descriptor (DBD) name: HIVRO, view ratio: 10 database records. As used herein, a "view ratio" is the size (i.e., number of database records) of a view envelope. An "initial view ratio" is a "view ratio" that is used for a first screen display (i.e., the "initial view") of a database. The initial view ratio is calculated such that the entire database may be shown in one standard-size screen. The user may then be able to visually scan the database record organization characteristics of the entire database at a glance. The ability to see a visual representation of the database record organization characteristics in one "big picture" view may emphasize or highlight patterns that would not be as readily recognizable otherwise.

One benefit of a graphical display of the database record organization characteristics is that a user may be able to recognize important aspects of how database records are organized or disorganized within the IMS database. Such important aspects may not be as readily apparent to the user if the database record organization characteristics are displayed in other than a graphical format (e.g., in a table or a list of values).

In an alternate initial view, any view envelope with at least one database record requiring reorganization may cause the view envelope to be colored "red" (or marked with a particular symbol, e.g., *).

Figure 4:
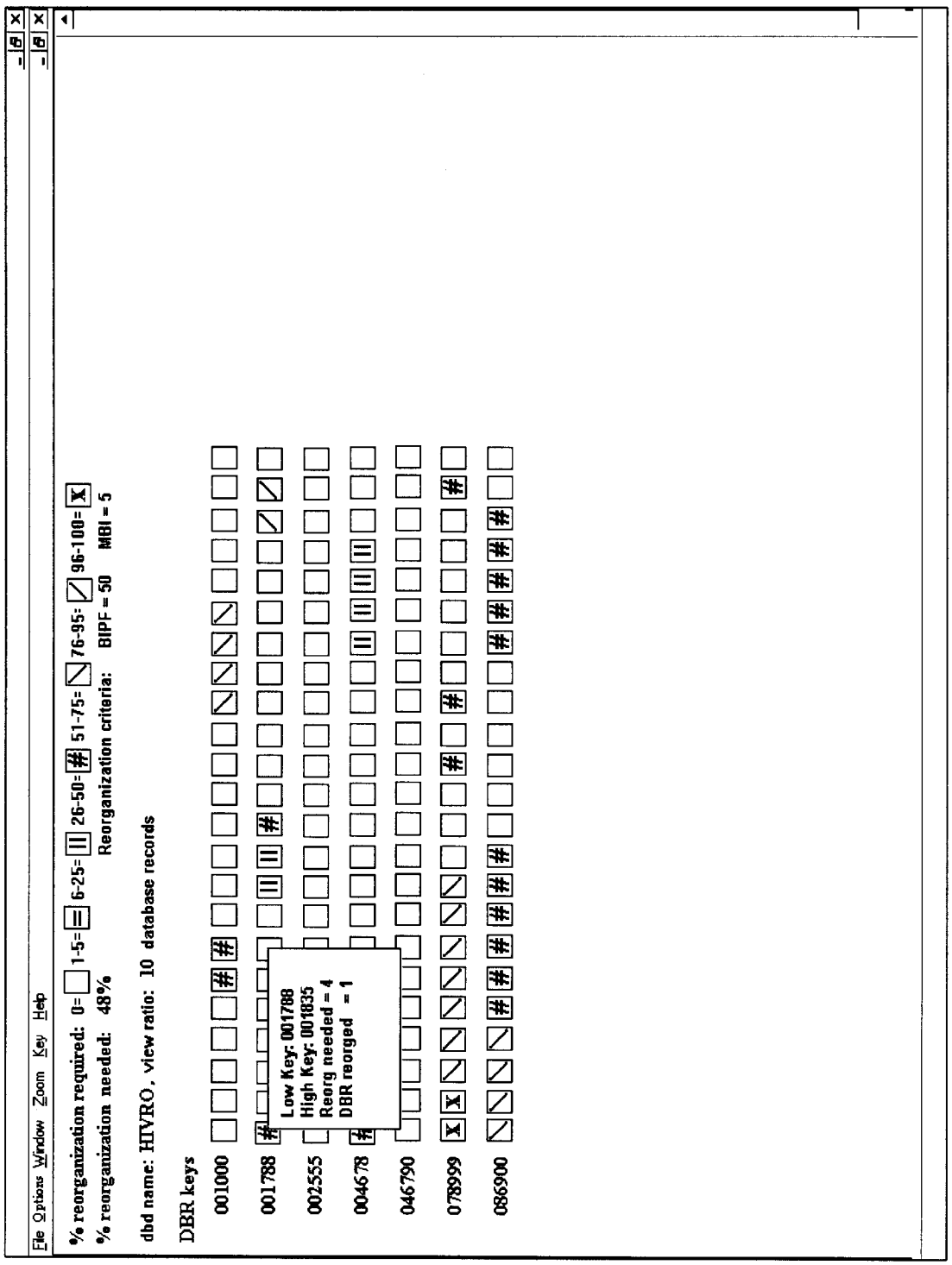
FIG. 4 is a screen shot of an identification of a view envelope beginning with database record (DBR) key 001788 according to one embodiment.

FIG. 4: Identification of a View Envelope

FIG. 4 is a screen shot of an embodiment of an identification of a view envelope beginning with database record (DBR) key 001788 from the initial view of IMS database HIVRO, as shown in FIG. 3. In one embodiment, a right-click of a mouse when the mouse is pointing to a single view envelope may indicate an "identification" user request. Identifying a view envelope may be a way to display identifying information about the view envelope (e.g., Low Key, High Key, Reorganization needed (i.e., the count of DBRs classified as needing reorganization), and database record (DBR) reorganized (i.e., the count of DBRs previously reorganized)). As shown in FIG. 4, the pop-up identification window includes: "Low Key: 001788, High Key: 001835, Reorg needed=4, and DBR reorged=1". The two keys shown in the pop-up identification window indicate the range (i.e., low to high) of the DBR keys represented by the view envelope being identified. The "Reorg needed=4" line may indicate that four of the database records represented by the view envelope need reorganization. The "DBR reorged=1" line may indicate that one of the database records represented by the view envelope has already been reorganized.

Figure 5:
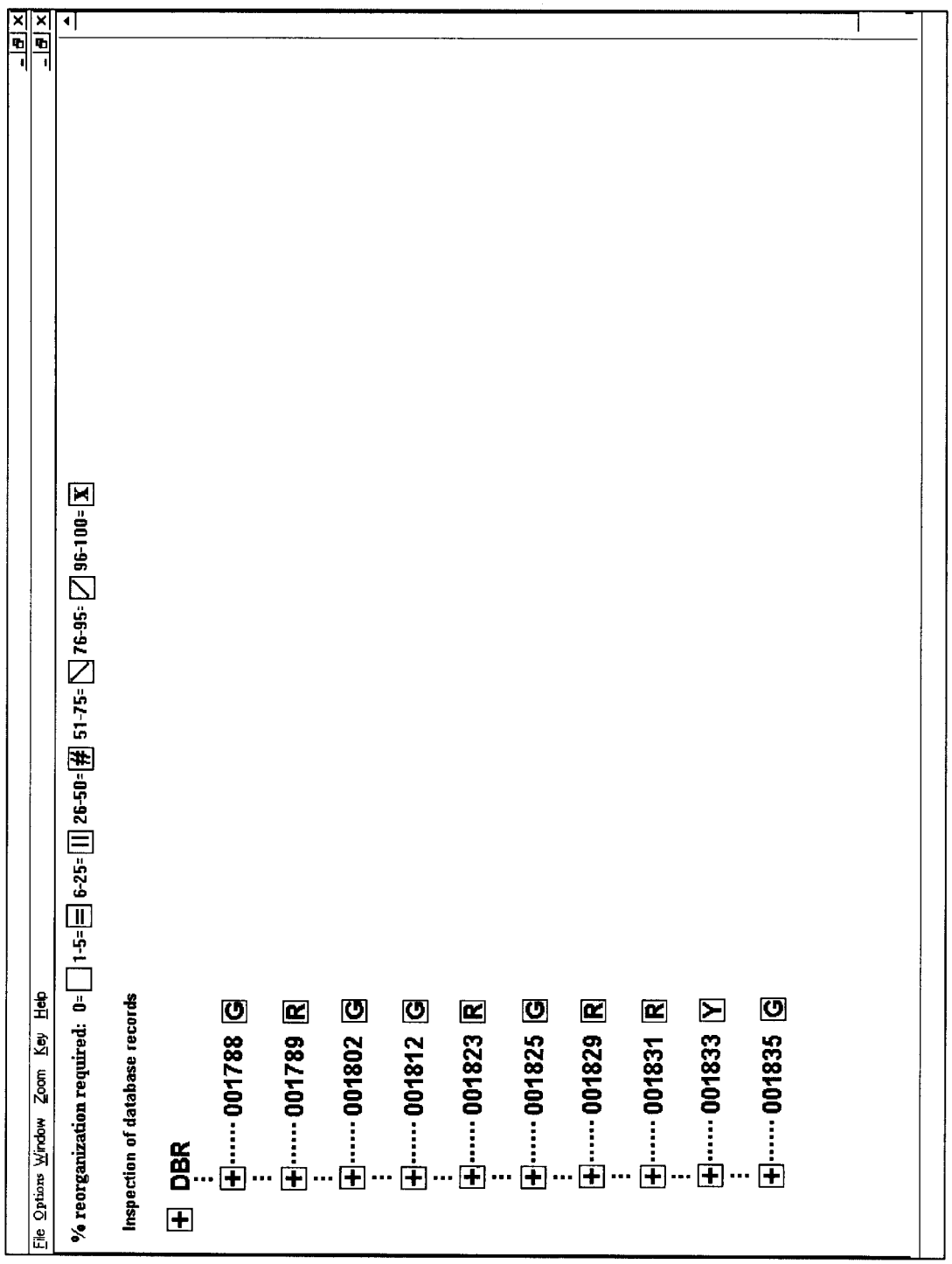
FIG. 5 is a screen shot of an inspection of database records represented by a view envelope beginning with DBR key 001788 according to one embodiment.

FIG. 5: Inspection of Database Records

FIG. 5 is a screen shot of an embodiment of an inspection of database records represented by a view envelope beginning with DBR key 001788 from either FIG. 3 or FIG. 4. The plus ("+") sign indicators shown in FIG. 5 may indicate that further information is available concerning the DBR key to the right of each plus sign indicator. Conventionally, the DBR keys shown to the right of plus signs may be referred to as collapsed. Selecting a particular plus sign may cause the plus sign to change to a minus ("−") sign, additional information may be displayed, and the DBR key may then be referred to as expanded (refer to FIG. 7 or FIG. 8 for an example of an expanded DBR key).

The letters "G", "R", and "Y" shown to the right of each database record (DBR) key represent the colors: green, red, and yellow, respectively. In one embodiment, the numbers representing the DBR keys (e.g., 001788) may be highlighted with the respective color. For example DBR keys 001788, 001802, 001812, 001825, and 001835 may be highlighted in green; DBR key 001833 may be highlighted in yellow; and DBR keys 001789, 001823, 001829, and 001831 may be highlighted in red. Using the colors green, yellow, and red to visually indicate the state of the DBR in this example is analogous to a traffic signal light (i.e., everything running smoothly, thus no reorganization required may be indicated by green; yellow may indicate that the DBR has recently been reorganized; and red may indicate that the DBR is in need of reorganization).

FIG. 6: Identification of an Inspected Database Record

FIG. 6 is a screen shot of an embodiment of an identification of an inspected database record beginning with DBR key 001823, from the inspection view of the view envelope, as shown in FIG. 5. In one embodiment, a right-click of a mouse when the mouse is pointing to a single collapsed DBR key may indicate an "identification" user request, similar to the example shown in FIG. 4. The information shown in FIG. 6 differs from the information shown in FIG. 4, as the "identification" in FIG. 6 follows an "inspection" request. The "identification" in FIG. 6 may thus be referred to as an "inspection/identification" request, to distinguish it from the "identification" shown in FIG. 4. An "inspection/identification" of a collapsed DBR key may be a way to display identifying information about the DBR (e.g., Key, Blocks Used, Estimated Blocks needed, Mark for reorganization, and Submit for reorganization).

As shown in FIG. 6, the pop-up identification window includes: "Key: 001823 Reorganization required; Blocks used=32; Estimated Blocks needed=12; Mark for reorganization; and Submit for reorganization". The key shown in the pop-up identification window indicates the DBR key represented by the collapsed DBR key being identified. The words "Reorganization required" following the key number indicate the reorganization state of the DBR. In one embodiment, the reorganization state may be one of three values: no reorganization required (i.e., green, as shown in FIG. 5); has recently been reorganized (i.e., yellow), or reorganization required (i.e., red). The "Blocks used=32" line may indicate that DBR with key 001823 occupies or uses 32 blocks. The "Estimated Blocks needed=12" line may indicate that DBR with key 001823 is estimated to require 12 blocks after reorganization.

The last two entries in the pop-up identification window are selectable via a pointing device, such as a mouse. The "Mark for reorganization" term, when selected, may add an entry for DBR with key 001823 in a reorganization list of DBR keys requiring reorganization. Once selected, the "Mark for reorganization" term may be changed to "Unmark for reorganization", to indicate that the DBR with key 001823 is currently on the reorganization list, and will be reorganized on a subsequent "Submit for reorganization" selection (whether "Submit" is chosen while viewing the DBR with key 001823 or "Submit" is chosen via the Options menu, as described earlier). Similarly, if "Unmark for reorganization" is selected, the DBR with key 001823 is removed from the reorganization list, and therefore will not be reorganized on a subsequent "Submit for reorganization" selection.

The "Submit for reorganization" term, when selected within the pop-up identification window shown in FIG. 6, may cause the specific DBR being inspected/identified (i.e., the DBR with key 001823) to be reorganized. In one embodiment, selecting "Submit for reorganization" may cause an immediate reorganization request to be transmitted from a client computer system on which the graphical user interface may be displayed to a mainframe computer system, for processing of the request, provided that the connection between the client computer system and the mainframe computer system is active at the time of the submission.

Figure 7:
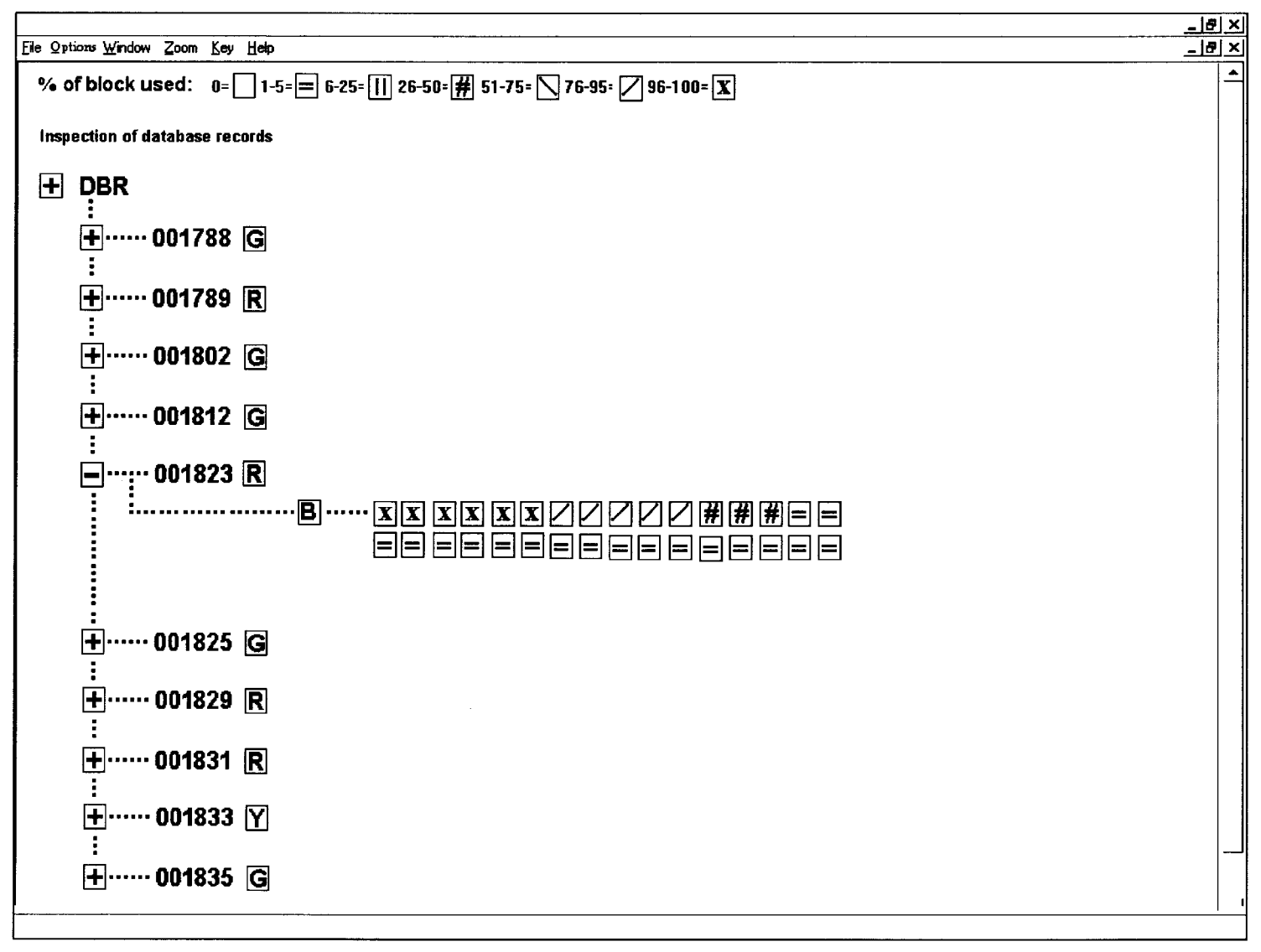

FIG. 7: Expansion of an Inspected Database Record

FIG. 7 is a screen shot of an embodiment of an expansion of an inspected database record with DBR key 001823, from the inspection view of the collapsed DBR key, as shown in FIG. 5. In one embodiment, a left-click of a mouse when the mouse is pointing to a collapsed DBR key (i.e., an expansion request) while within a first inspection window, may indicate a "detailed inspection" user request, similar to the "inspection" example shown in FIG. 5. The information shown in FIG. 7 differs from the information shown in FIG. 5, as the "detailed inspection" in FIG. 7 follows an "inspection" request, (i.e., it is a second "inspection" request) whereas the "inspection" shown in FIG. 5 is a first "inspection" request. The "detailed inspection" in FIG. 7 may thus be referred to as a "second inspection" or a "detailed inspection" request, to distinguish it from the "inspection" shown in FIG. 5. A "detailed inspection" of an inspected collapsed DBR key may be a way to display identifying information about the blocks used by a DBR key (e.g., view envelopes indicating "% of block used" for each block used by the DBR). It is noted that the symbols used to indicate "% of block used" in FIG. 7 correspond to the symbols used to indicate "% reorganization required" in FIG. 5; other symbols and/or colors may be used in alternate embodiments. The "B" preceding the "% of block used" view envelopes indicates that the view envelopes represent the DBR "Before" any reorganizations have taken place.

Although not shown, a subsequent right-click of a mouse on one of the "% of block used" view envelopes shown in FIG. 7 may cause a "detailed identification" pop-up window to be displayed. Information that may be displayed in a "detailed identification" may include: percentage (%) of identified block used by DBR segments, partition number, data set group number, RBN (relative block number). For example: "% block used=95; Partition number=1; Data set group number=1; RBN=004A80". As used herein, a "relative block number" (RBN) may represent a way to reference a block, the RBN may be determined by dividing the RBA (relative byte address) by the block size.

Figure 8:
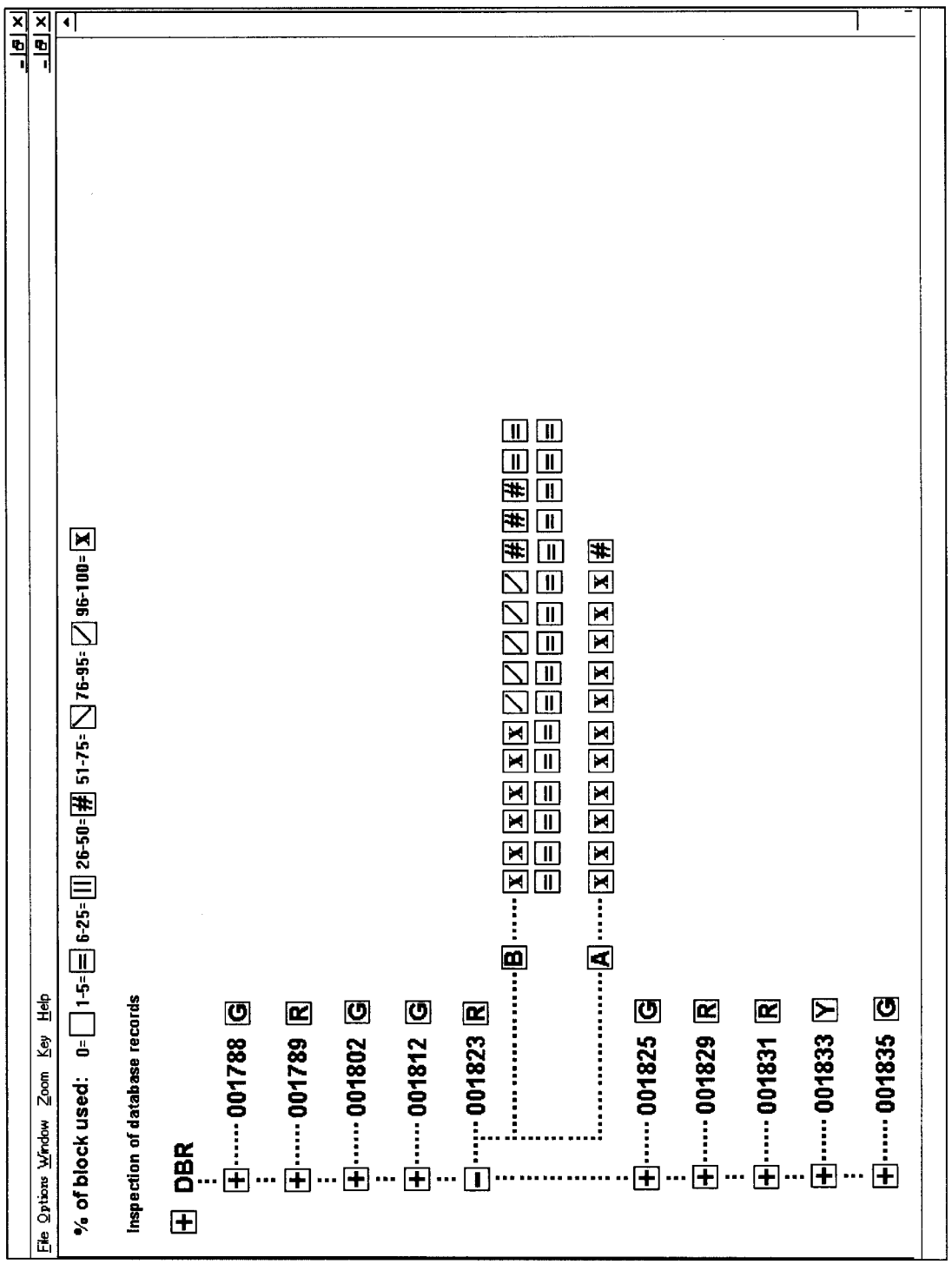
FIG. 8 is a screen shot of an expansion of an inspected database record with DBR key 001823 after DBR key 001823 is submitted for reorganization according to one embodiment.

FIG. 8: Expansion of an Inspected Database Record After Reorganization

FIG. 8 is a screen shot of an embodiment of an expansion of an inspected database record with DBR key 001823, from the identification view of the collapsed DBR key, as shown in FIG. 6, after DBR with key 001823 is submitted for reorganization.

For this embodiment, it is assumed that "Submit for reorganization" is selected in FIG. 6. Subsequent to the transmission of the reorganization request from the client computer system on which the graphical user interface may be displayed to the mainframe computer system, the mainframe computer system processes the request. Subsequent to the reorganization of DBR with key 001823, the mainframe computer system may refresh the graphical user interface on the client computer system with the updated information regarding the results of reorganizing DBR with key 001823. This refresh may occur automatically, or may be user-driven (i.e., via a menu item or some other user selection requesting a "refresh" of the organization data).

It is noted that FIG. 8 differs from FIG. 7 in the following ways, these differences may be caused by the reorganization of DBR with key 001823 and a subsequent "refresh" of the organization data in the graphical user interface: (1) DBR with key 001823 is marked as 'red' in FIG. 7 (i.e., reorganization required), and 'yellow' in FIG. 8 (i.e., the DBR has recently been reorganized); and (2) FIG. 8 may include an "After" (i.e., indicated by the "A" preceding the second set of "% of block used" view envelopes in FIG. 8) set of view envelopes, which shows the organization of the blocks "After" a reorganization has taken place, in addition to the "Before" set (it is noted that the "Before" set matches the view envelopes indicating "% of block used" in FIG. 7). As shown in the "After" set of view envelopes, all but the last of the blocks are full (i.e., 96–100% used), and the last block is shown at 26–50% used. When the last block in an "After" set of view envelopes is something other than 96–100% used, that may indicate that the number of segments in the DBR does not evenly divide into a number of blocks (i.e., the remainder of segments are stored in the last block, and do not completely fill the last block). A reorganization will pack the blocks as full as possible, however, there may be cases where a reorganization of a DBR may result in blocks that are less than 96–100% used by a single DBR, due to the ratio of segment size to block size. The free space remaining in a block may be filled by a different DBR.

For example, consider the case where the block size is 4000 bytes and a DBR has a segment size that is more than half of the block size (e.g., 3000 bytes). In this case, the ratio of segment size to block size is 3000/4000 or 75%, therefore 25% of each block (i.e., 1000 bytes) may be filled with data from a different DBR. At best, blocks containing data from this DBR may be marked as 75% full of data from a single DBR (or some range of percentage that includes 75%, e.g., 51–75%), and no amount of reorganizing may ever increase that percentage above 75%, due to the ratio of segment size to block size.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of graphically displaying database record organization characteristics of an Information Management System (IMS) database, the method comprising:

receiving information associated with a plurality of database records from the IMS database wherein the information associated with the plurality of database records comprises information associated with ranges of database records within the IMS database;

processing the information associated with the plurality of database records to generate database information;

calculating a first view ratio based upon the database information;

building a working storage array, wherein the working storage array consolidates the information associated with the plurality of database records;

constructing a plurality of view envelopes based upon data in the working storage array;

graphically displaying database record organization characteristics on a display, wherein the database record organization characteristics are determined from at least a sub-set of the plurality of view envelopes;

receiving user input specifying a sub-set of the plurality of view envelopes to be graphically displayed;

selecting one of the plurality of view envelopes; and graphically displaying detailed information for the selected view envelope;

wherein the selected view envelope is represented by a database record key value;

wherein the database record key value is identified to be one of the following: (a) in need of reorganization; (b) recently reorganized; (c) organized.

2. The method of claim 1, further comprising:

expanding the selected view envelope;

graphically displaying detailed information for the expanded selected view envelope.

3. The method of claim 2, wherein the detailed information for the expanded selected view envelope further comprises a database record key value for the expanded selected view envelope.

4. The method of claim 2, wherein the detailed information for the expanded selected view envelope further comprises an organization indicator for the database record key value, wherein the organization indicator is one of the following: (a) in need of reorganization, (b) recently reorganized; (c) organized.

5. The method of claim 2, wherein the detailed information for the expanded selected view envelope further comprises a number of blocks used.

6. The method of claim 2, wherein the detailed information for the expanded selected view envelope further comprises an estimated number of blocks needed.

7. The method of claim 2, wherein the detailed information for the expanded selected view envelope further comprises a mark for reorganization indicator for the database record key value, wherein the mark for reorganization indicator is one of the following: (a) mark for reorganization; (b) unmark for reorganization.

8. The method of claim 7, wherein at least one marked for reorganization database record key value is submitted for reorganization, wherein the information associated with the plurality of database records comprises the at least one database record key value, and wherein the mark for reorganization indicator comprises the value mark for reorganization.

9. The method of claim 7, wherein at least one marked for reorganization database record key value is unmarked for reorganization, wherein the information associated with the plurality of database records comprises the at least one database record key value, and wherein to mark for reorganization indicator is changed from the value mark for reorganization to the value unmark for reorganization.

10. The method of claim 2, wherein the detailed information for the expanded selected view envelope further comprises a submit for reorganization indicator for the database record key value, wherein the submit far reorganization indicator, when selected, causes the database record key value to be submitted for reorganization.

11. The method of claim 10, wherein the graphical display of the expanded selected view envelope comprises an indication of an amount of blocks used, prior to submission for reorganization.

12. The method of claim 11, wherein the indication of the amount of blocks used is described as a percentage.

13. The method of claim 11, wherein the indication of the amount of blocks used is described as a range of percentages.

14. The method of claim 13, wherein the range of percentages is user configurable.

15. The method of claim 10, wherein the graphical display of the expanded selected view envelope comprises an indication of an amount of blocks used, after submission for reorganization.

16. The method of claim 15, wherein the indication of the amount of blocks used is described as a percentage.

17. The method of claim 15, wherein the indication of the amount of blocks used is described as a range of percentages.

18. The method of claim 17, wherein the range of percentages is user configurable.

* * * * *